United States Patent
Yagyu et al.

(10) Patent No.: US 7,209,450 B2
(45) Date of Patent: Apr. 24, 2007

(54) DATA TRANSMISSION SYSTEM HAVING A PLURALITY OF DYNAMIC ROUTE CONTROL UNITS

(75) Inventors: Tomohiko Yagyu, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 1009 days.

(21) Appl. No.: 10/175,073

(22) Filed: Jun. 20, 2002

(65) Prior Publication Data

US 2002/0196738 A1    Dec. 26, 2002

(30) Foreign Application Priority Data

Jun. 20, 2001    (JP)    ............................. 2001-185701

(51) Int. Cl.
*H04L 12/56* (2006.01)
(52) U.S. Cl. ...................... 370/238; 370/359; 370/360; 709/238
(58) Field of Classification Search ................ 370/400, 370/401, 238, 392; 709/241, 238
See application file for complete search history.

(56) References Cited

U.S. PATENT DOCUMENTS

| | | | | |
|---|---|---|---|---|
| 6,078,963 | A * | 6/2000 | Civanlar et al. | 709/238 |
| 6,252,878 | B1 * | 6/2001 | Locklear et al. | 370/401 |
| 6,496,510 | B1 * | 12/2002 | Tsukakoshi et al. | 370/401 |
| 6,560,233 | B1 * | 5/2003 | Hatanaka et al. | 370/401 |
| 6,987,762 | B2 * | 1/2006 | Shiota | 370/389 |
| 6,999,461 | B2 * | 2/2006 | Li et al. | 370/400 |

OTHER PUBLICATIONS

OSPF (Open Shortest Path First), Version 2, IETF (Internet Engineering Task Force), RFC (Request for Comments) 2328, John Moy, 1998, 8, pp. 1-244.
Jibiki et al., "A Parallel Router Architecture Based on Sparse-combining with a Network", vol. 42, No. 12, Dec. 2001, pp. 2916-2937.
Morishita et al., "Proposal for a Serial Router Architecture", Compilation of Presentations at the 2000 Electronics Information Communication Association Conference, B-6-43, Mar. 7, 2000.
Jun Wang and Klara Nahrstedt, "Parallel IP Packet Forwarding for Tommorrow's IP Routers", 2001 IEEE Workshop on High Performance Switching and Routing 2001 (HPSR2001), May 29, 2001, pp. 353-357.

* cited by examiner

*Primary Examiner*—Hassan Kizou
*Assistant Examiner*—Bo Hui A Zhu
(74) *Attorney, Agent, or Firm*—Young & Thompson

(57) ABSTRACT

A data transmission system includes a plurality of dynamic route control units each disposed for one of a plurality of interfaces provided in the data transmission system. The route control data prepared by the dynamic route control units are combined by a specified dynamic route control unit to obtain in-system route control data, which is delivered to all the dynamic route control units. Each dynamic route control unit calculates costs for the routes between the own system and other data transmission systems based on the in-system route control data and new route control data received.

7 Claims, 4 Drawing Sheets

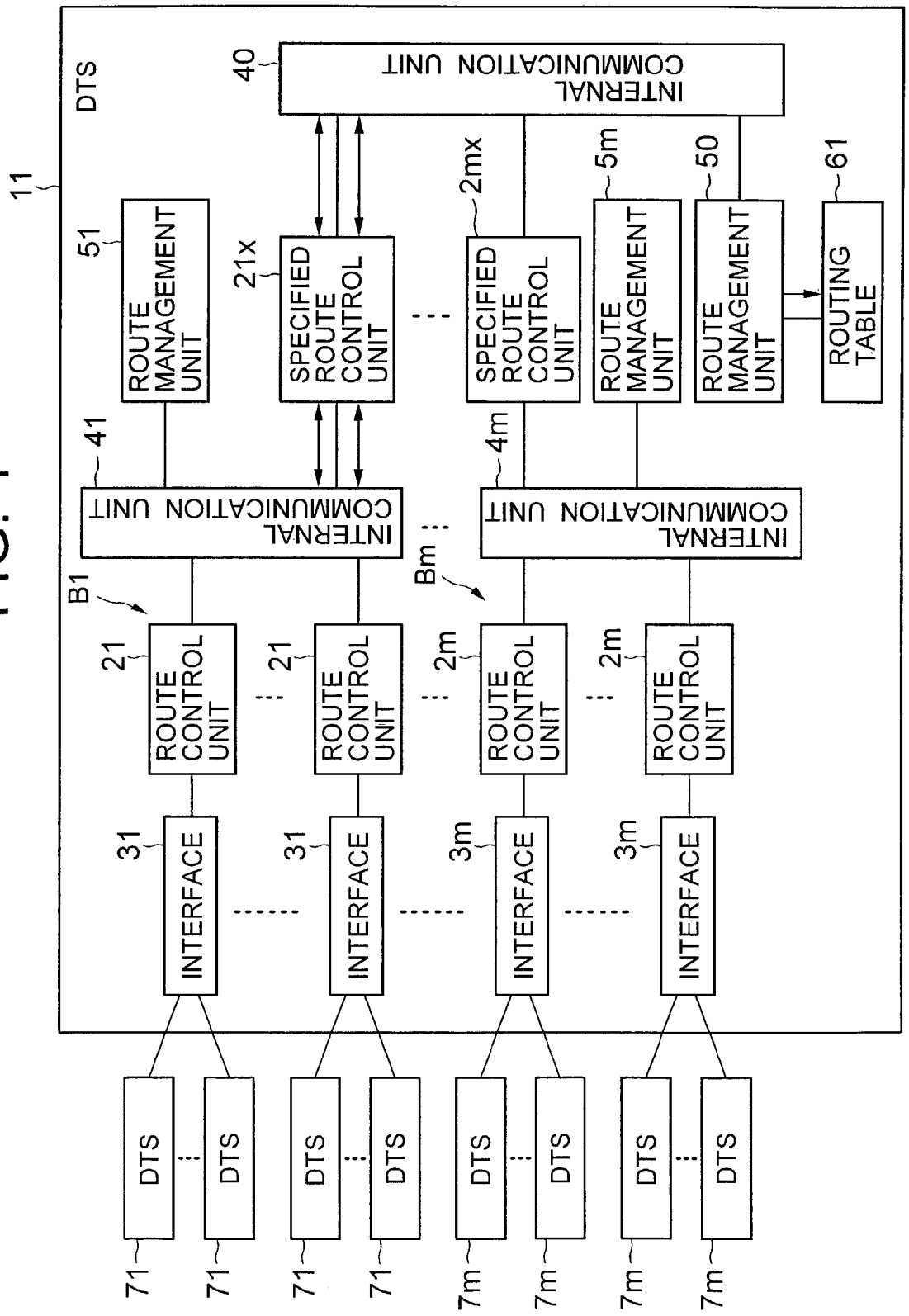

DATA TRANSMISSION SYSTEM HAVING A PLURALITY OF DYNAMIC ROUTE CONTROL UNITS

BACKGROUND OF THE INVENTION (a) Field of the Invention

The present invention relates to a data transmission system having a plurality of dynamic route control units and, more particularly, to a data transmission system for transmitting data packets to and from a plurality of other transmission systems through a network by using a dynamic route control technique.

(b) Description of the Related Art

A dynamic route control technique for a conventional data transmission system is described in IETF (Internet Engineering Task Force), RFC (Request For Comments) 2328, "OSPF (Open Shortest Path First) Version2", August, 1998 by John Moy. The described dynamic route control technique uses a single route control protocol, or single route control unit, in a single route control domain.

FIG. 1 shows the data transmission system (DTS) using the dynamic route control technique described in the above publication. The data transmission system 10 includes a dynamic route control unit 20, a routing table 60 and a plurality (n) of interfaces 91, wherein the data transmission system 10 is connected to other data transmission systems 71 under the control by interfaces 91.

The dynamic route control unit 20 performs transmission of route control data with respect to all the interfaces 91 provided in the data transmission system 10. The dynamic route control unit 20 also performs calculation for all the routes in the network between these interfaces 91 and other data transmission systems 71 that are accessible from the interfaces 91 through the network. The term "route control data" as used herein means the information with respect to the interfaces in the data transmission system 10, the information including addresses, communication costs etc., of the other data transmission systems that are accessible via the interfaces 91.

Adjacent two of the data transmission systems 71 and 10 in the network performs transmission of the route control data therebetween by using the route control processing. In other words, the data transmission systems 10 and 71 in the domain share the route control data among them, which are created by all the data transmission systems 10 and 71 in the domain. Thus, it may happen that the data transmission system 10 having a plurality of interfaces 91 receives the same route control data from a plurality of other data transmission systems 71. In such a case, the data transmission system 10 compares the route control data thus received against the route control data stored in the database of the data transmission system 10. If both the route control data are the same, the route control data thus received is discarded for avoiding a duplication. The term "domain" as used herein means an area of network dynamically route-controlled.

The data transmission system 10 creates the graph of the network configuration including the other data transmission systems 71 in the domain based on the route control data stored therein, and also calculates to obtain the minimum distance route between the own system and each of the other data transmission systems in the network configuration. In short, the dynamic route control unit 20 performs both transmission of the route control data and calculation for the minimum distance route in the conventional data transmission system 10.

In the conventional data transmission system 10, the single dynamic route control unit 20 performing both transmission of the route control data and calculation for the minimum distance route may be unable to perform both the tasks due to overload thereof if the number of the interfaces 91 provided in the entire domain is larger compared to the ability thereof. Or else, even if the dynamic route control unit 20 is somehow able to perform both the tasks, the larger time length for the tasks may cause a larger time length needed to stabilize the data route in the case of change in the network configuration.

More specifically, a large number of interfaces 91 associated with the data transmission system 10 increases the number of times for transmission of the route control data, and also increases the burden of the calculation for the data route on the dynamic route control unit 20. In worst case, the transmission processing itself may exceed the capability of the dynamic route control unit 20, whereby the dynamic route control unit 20 is unable to perform the data transmission itself by using the associated interfaces 91. This limits the possibility of extension of the number of interfaces in the network.

SUMMARY OF THE INVENTION

In view of the above problem in the conventional data transmission system, it is an object of the present invention to provide a data transmission system which is capable of performing both transmission of the route control data and calculation for the minimum distance route in parallel even in the case of a larger number of the interfaces being provided in the data transmission system, to thereby prevent the stall or performance deterioration of the data transmission system caused by the increase of the convergence time in the network.

The present invention provides a data transmission system including a plurality of interfaces, a plurality of dynamic route control units each disposed for a corresponding one of the interfaces, each of the dynamic route control units transmitting/receiving route control data from other dynamic transmission systems through a corresponding one of the interfaces, an internal communication unit, the dynamic route control units exchanging route control data thereamong via the internal communication unit to share common route control data, the dynamic route control units calculating costs for routes between the data transmission system and the other data transmission systems.

In accordance with the data transmission system of the present invention, the burden on the dynamic route control units can be reduced and thus the data transmission system is suited to extension of interfaces in the domain of the network.

The above and other objects, features and advantages of the present invention will be more apparent from the following description, referring to the accompanying drawings.

BRIEF DESCRIPTION OF THE DRAWINGS

FIG. 4 is a block diagram of a data transmission system in a network according to a third embodiment of the present invention.

PREFERRED EMBODIMENTS OF THE INVENTION

Figure 1:
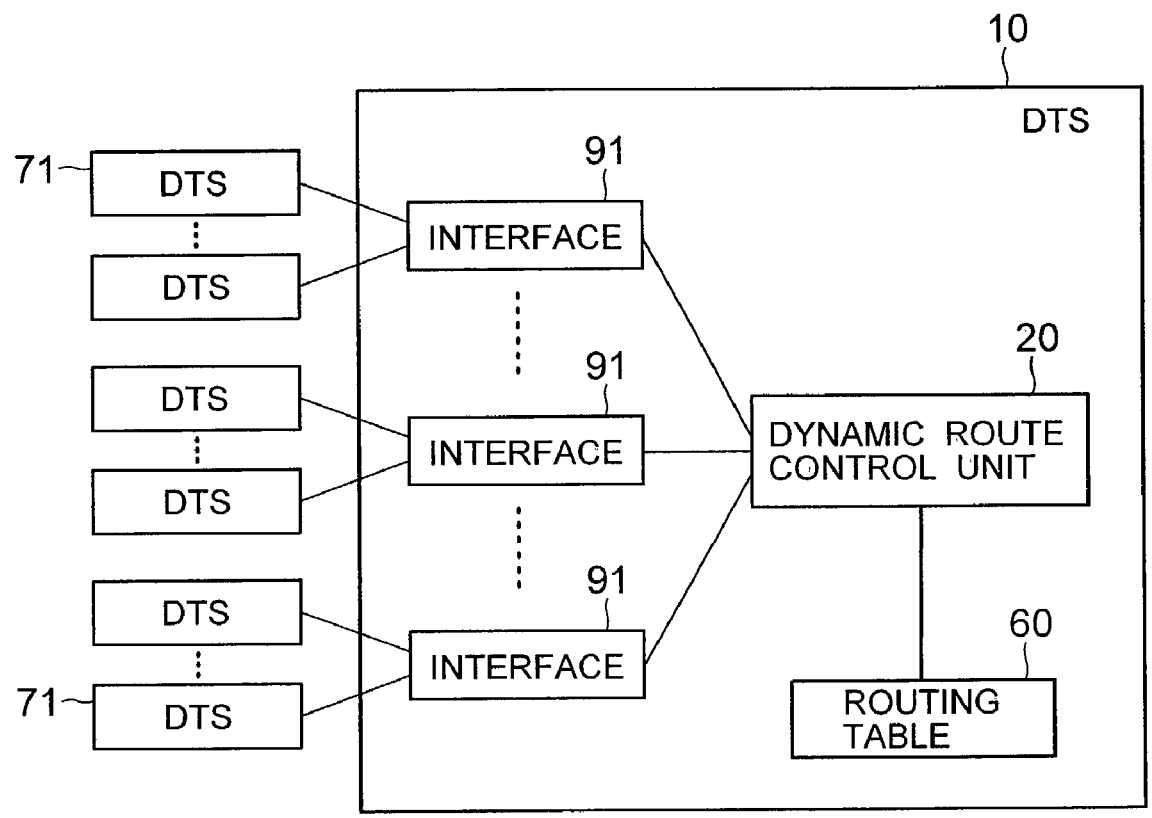
FIG. 1 is a block diagram of a conventional data transmission system in a network.

Now, the present invention is more specifically described with reference to accompanying drawings, wherein similar constituent elements are designated by similar reference numerals throughout the drawings.

Figure 2:
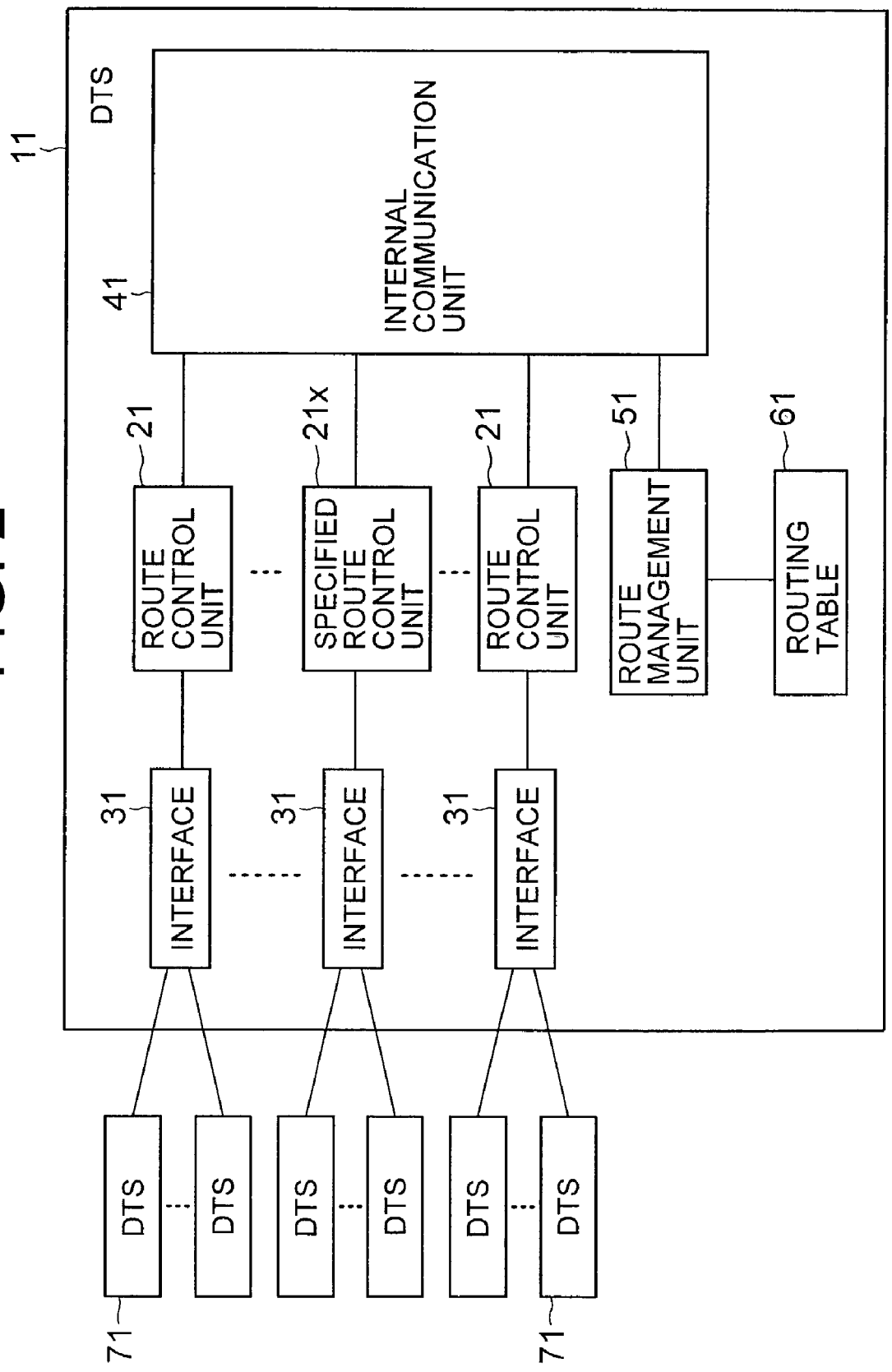
FIG. 2 is a block diagram of a data transmission system in a network according to a first embodiment of the present invention.

Referring to FIG. 2, a data transmission system, generally designated by numeral 11, according to a first embodiment of the present invention includes a plurality (n) of interfaces 31, a plurality (n) of dynamic route control units 21 each provided for a corresponding one of the interfaces 31, an internal communication unit 41, a route management unit 51 and a routing table 61.

The data transmission system 11 is connected to a group of other data transmission systems 71 under the control by a first interface 31, and connected to other groups of other data transmission systems 71 under the control by respective interfaces 31 including second to n-th interfaces 31.

The dynamic route control unit 21 performs transmission of the route control data as well as other data to and from the first group of the other data transmission systems 71 via the first interface 31, and to and from the groups of the other data transmission systems 71 via the respective interfaces 31.

In operation, after the data transmission system 11 is turned on into service, the dynamic route control units 21 delivers operation notification data among them via the internal communication unit 41. The dynamic route control units 21, which have received the operation notification data, determine and specify one of the dynamic route control units 21 as a specified dynamic route control unit 21x based on an algorithm for determining the specified dynamic route control unit 21x. The algorithm is such that one of the dynamic route control units 21 which has a highest priority or a highest identification code is selected from the plurality (n) of dynamic route control units 21 as the specified dynamic route control unit 21x. The identification codes of the dynamic route control units 21 are determined in the latter case based on specified settings.

Each of the dynamic route control units 21 creates own internal route control data based on the interface information stored therein and supplies the own internal route control data to the others of the dynamic route control units 21 via the internal communication unit 41. The interface information includes the statuses of the other data transmission systems 71 connected through the interface 31 controlled by the dynamic route control unit 21, and information as to "busy" or "idle" of the interface 31 and the address thereof. The internal route control data includes a table tabulating the address, communication cost etc. as to the interface 31 controlled by each dynamic route control unit 21.

The specified dynamic route control unit 21x combines together the internal route control data prepared by the respective dynamic route control units 21 to create in-system route control data (or common route control data). The in-system route control data is transmitted to the other data transmission systems 71 in the domain, whereas the in-system route control data created by each of the other data transmission systems 71 are also transmitted to the data transmission system 11. Upon receiving new route control data, the dynamic route control unit 11 delivers the new route control data to the other dynamic route control units 21 in the data transmission system 11 via the internal communication unit 41.

Each dynamic route control unit 21 receives new route control data from the corresponding other data transmission systems. The dynamic route control unit 21 finds the routes between the own system and nodes or other data transmission systems 71 which are accessible via the network from the corresponding interface 31 controlled by the each of the dynamic route control units 21, based on the new route control data and the in-system route control data created by the specified dynamic route control units 21. The dynamic route control unit 21 then calculates the costs for the routes. The data for the routes and the costs thereof created by the dynamic route control units 21 are delivered to the route management unit 51. The route management unit 51 selects an optimum data route among the data routes for which the costs are calculated by the dynamic route control units 21, and stores the optimum data route in the routing table 61. The data transmission system 11 forwards and exchanges packet data based on the information of the optimum data routes stored in the routing table 61.

It is to be noted that the specified dynamic route control unit 21x undertakes heavier burden compared to the other dynamic route control units 21 in the data transmission system 11 of the present embodiment.

Figure 3:
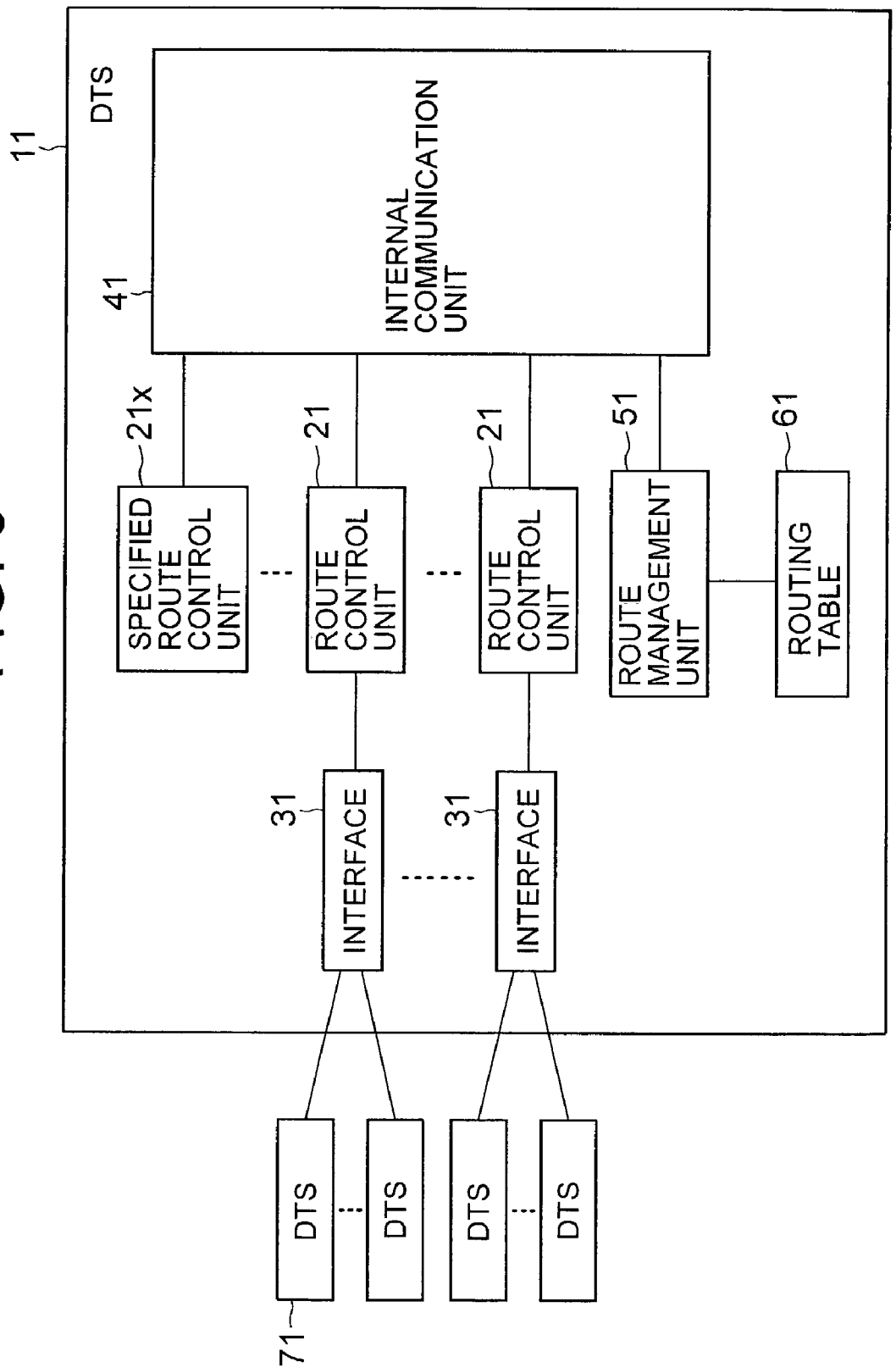
FIG. 3 is a block diagram of a data transmission system in a network according to a second embodiment of the present invention.

Referring to FIG. 3, a data transmission system according to a second embodiment of the present invention has a specified dynamic route control unit 21x which does not directly control any interface 31 in the data transmission system 11 and thus does not perform transmission of the route control data via the interface 31. This configuration reduces the burden on the specified dynamic route control unit 21x. The operation notification data created by the specified dynamic route control unit 21x has a higher priority compared to the operation notification data created by the other dynamic route control units 21. Thus, the dynamic route control unit 21x having no associated interface to be managed thereby is specified as the specified dynamic route control unit 21x among the dynamic route control units 21 and 22. In this configuration, the dynamic control units 21 need not create the in-system route control data and can perform data transmission with the reduced burden thereon.

Referring to FIG. 4, a data transmission system 11 according to a third embodiment of the present invention includes a plurality (m) of data transmission blocks B1 to Bm each including a plurality of interfaces 31, . . . 31; . . . ; or 3m, . . . 3m, a plurality of dynamic route control units 21, . . 21; . . . ; or 2m, . . . 2m, a first internal communication unit 41, . . . , or 4m, a specified dynamic route control unit 21x, . . . or 2mx, a route management unit 51, . . . , 5m.

The data transmission blocks B1 to Bm perform data transmission therebetween via a second internal communication unit 40, delivers and receives data to/from a second-stage route management unit 50 via a second-stage internal communication unit 40.

The specified dynamic route control unit 21x, . . . , or 2mx in each of the data transmission blocks B1, . . . , or Bm is determined among the dynamic route control units 21x, . . . , 2mx and 21, . . . , 21; . . . ; or 2m, . . . , 2m of the each of the blocks based on the priority. Each dynamic route control unit 21, . . . , or 21 in the first block B1, for example, prepares first-stage internal route control data based on the corresponding interface information controlled by the each dynamic route control unit 21, . . . , or 21.

The specified dynamic route control unit 21x in the first block B1 combines the first-stage internal route control data together to obtain second-stage internal route control data (common route control data) which includes information with respect to all the interfaces in the first block B1. Other specified dynamic route control unit 22x, . . . , or 2mx also combines the respective first-stage route control data to obtain respective second-stage internal route control data. The second-stage internal route control data created by the specified dynamic control unit 21x, . . . , or 2mx is delivered to the route management unit 51, . . . , or 5m.

Each specified dynamic route control unit 21x, . . . , or 2mx delivers the operation notification data to other specified dynamic route control units 21x, . . . , 2mx via the second-stage internal communication unit 40. Among the specified dynamic route control units 21x, . . . , 2mx which have received operation notification data, a representative specified dynamic route control block (not specifically shown as such) is selected.

The representative specified dynamic route control unit combines the second-stage internal route control data together to obtain overall route control data as in-system route control data, which is delivered to the other specified dynamic route control units 21x, . . . , 2mx in the respective blocks B1 to Bm. Thereafter, the overall route control data is delivered to all of the dynamic route control units 21, . . . , 21; . . . ; or 2m, . . . , 2m.

The overall route control data prepared in the data transmission system 11 is delivered to the other data transmission systems 71, . . . , 71, . . . ; or 7m, . . . 7m. If new route control data is received from other data transmission system by one of the dynamic route control units 21, . . . , 21; . . . ; 2m, . . . , 2m, the new route control data is delivered to the other dynamic route control units 21, . . . , 21; . . . ; 2m, . . . , 2m via the internal communication units 41, . . . , 4m, and 40.

For example, the new route control data received by one of the dynamic route control units 21, . . . , 21 in the first block B1 from one of the other data transmission systems 71, . . . , 71 is delivered via the internal communication unit 41 to the specified dynamic route control unit 21x, from which the new route control data is forwarded to the other specified dynamic route control units 42, . . . , 4m. Each of the specified dynamic route control units 41, . . . , 4m delivers the new route control data to each of the dynamic route control units in the own block.

Based on the new route control data and the overall route control data prepared by the representative specified dynamic route control unit, each of the dynamic route control units 21, . . . , 21; . . . ; 2m, . . . , 2m finds the routes between the own system 11 and the nodes or the other systems 71, . . . 71; . . . , or 7m, . . . 7m in the network, which are accessible using the own interface, and then calculates the costs for the routes. The route data thus obtained by these dynamic route control units are delivered to the route management units 51, . . . , 5m via the internal communication units 41, . . . , 4m. Each of the route management units 51, . . . , 5m selects one of the data routes as an optimum data route and the selection information is delivered to the route management unit 50 via the internal communication unit 40. The route management unit 50 selects one of the optimum routes, prepared by the respective specified dynamic route control units, and stores the selected most optimum routes in the routing table 61 as the final optimum route information.

The data transmission system 11 performs forwarding or transmission of packet data based on the final optimum route information stored in the routing table 61.

The representative specified dynamic route control unit may be replaced by a dedicated specified dynamic route control unit which does not receive the route control data directly from the dynamic route control unit 21, . . . , 21; . . . ; or 2m, . . . 2m, and thus receive data only from the specified dynamic route control units 21x to 21m.

In the data transmission systems as described above, the dynamic route control units each provided for a corresponding interface alleviates the burden on the dynamic route control units. The route control processing performed by the plurality of dynamic control units in parallel allows extension of number of interfaces in the network. In addition, upon receiving new route control data, a route control unit delivers the new route control data to the other route control units, whereby the updated route control data can be shared by the dynamic control units in the data transmission system. This allows selection of an optimum route even in the case of occurring of a large number of packet data which have the same destination network.

The data transmission systems as described in this text may be routers, but not limited thereto. The data transmission system according to the present invention may be a communication device having a routing function, such as used between local area networks (LANs).

Since the above embodiments are described only for examples, the present invention is not limited to the above embodiments and various modifications or alterations can be easily made therefrom by those skilled in the art without departing from the scope of the present invention.

What is claimed is:

1. A data transmission system comprising:
a plurality of interfaces,
a plurality of dynamic route control units each disposed for a corresponding one of said interfaces, each of said dynamic route control units transmitting/receiving route control data from other data transmission systems through a corresponding one of said interfaces, and
an internal communication unit, said dynamic route control units exchanging route control data thereamong via said internal communication unit to share common route control data,
wherein said dynamic route control units calculate costs for routes between said data transmission system and said other data transmission systems, and
wherein the dynamic route control units determine one of the dynamic route control units as a specified dynamic route control unit, the specified dynamic router control unit combining internal route control data from the route control units and creating the common route control data from the combined data.

2. The data transmission system according to claim 1, wherein said plurality of interfaces and said dynamic route control units are grouped in a plurality of blocks, each of said blocks having a respective said specified dynamic route control unit, said specified ones of said dynamic route control units exchanging said common route control data thereamong via another internal communication unit to share in-system route control data.

3. The data transmission system according to claim 2, wherein a representative specified dynamic route control unit is selected among said specified dynamic route control units, and creates said in-system route control data.

4. The data transmission system according to claim 2, further comprising a representative specified dynamic route control unit for combining together common route control data prepared by said specified dynamic route control unit to obtain said in-system route control data, wherein said representative specified dynamic route control unit delivers said in-system route control data to said specified dynamic route control units.

5. The data transmission system according to claim 1, wherein each of said dynamic route control units calculates said costs for routes based on said common route control data and new route control data received from said other data transmission systems.

6. The data transmission system according to claim 5, further comprising a route management unit for selecting one of said routes for which the costs are calculated by said dynamic route control units as an optimum route, and a routing table for storing said optimum route.

7. The data transmission system according to claim 1, wherein said data transmission system is a router.

* * * * *